UNITED STATES PATENT OFFICE.

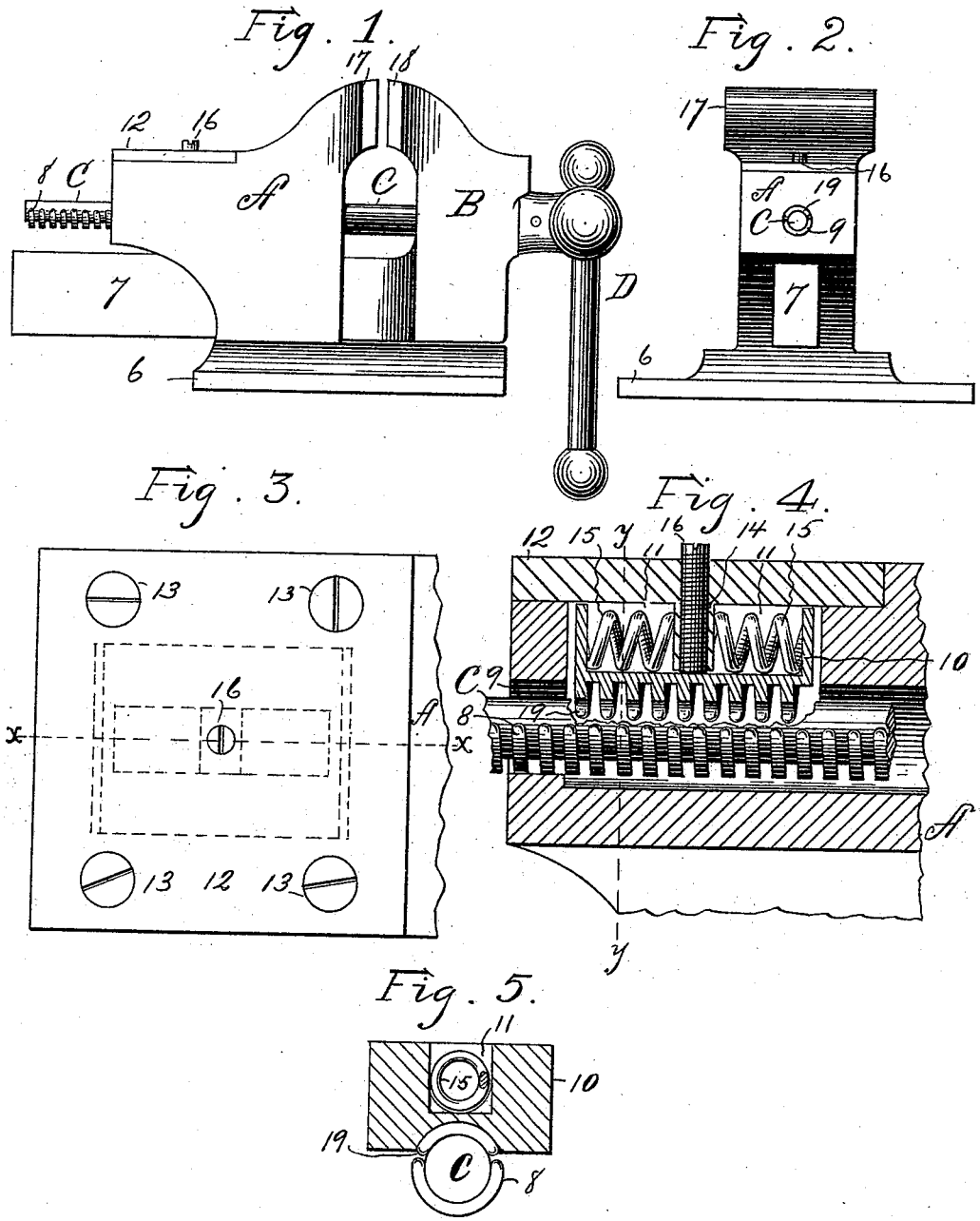

SAMUEL FRISBIE, OF UNIONVILLE, CONNECTICUT.

VISE.

SPECIFICATION forming part of Letters Patent No. 528,426, dated October 30, 1894.

Application filed January 3, 1894. Serial No. 495,509. (No model.)

*To all whom it may concern:*

Be it known that I, SAMUEL FRISBIE, a citizen of the United States, residing at Unionville, in the county of Hartford and State of Connecticut, have invented certain new and useful Improvements in Vises, of which the following is a specification.

My invention relates to improvements in vises of the class having a segmental screw, and the chief objects of my improvement are to provide for a better engagement of the screw and nut and to firmly support the screw and nut in a simple, convenient and efficient manner.

In the accompanying drawings: Figure 1 is a side elevation of my vise. Fig. 2 is a rear elevation of the same. Fig. 3 is an enlarged plan view of the part carrying the nut. Fig. 4 is a sectional view of the same on the line $x\,x$, some of the parts being shown in elevation, and Fig. 5 is a sectional view of the nut on the line $y\,y$ of Fig. 4, together with an end view of the screw.

A designates the fixed member of the vise having the jaw 17, said member being supported upon any suitable base plate 6, and B is the movable member which is guided in its movements to and from the member A by the arm or slide 7 which extends through suitable guides or ways in the member A. This member B is provided with the jaw 18 and segmental screw C and its handle D, said screw being secured within the member B in any ordinary manner. This screw C is provided with segmental threads 8 which preferably extend about two thirds around the screw and are rounded off in every direction at their outer ends. The screw C passes through a hole 9 in the member A, which hole at the rear end is of a diameter corresponding with the largest diameter of the screw so as to furnish a bearing for the under side of said screw.

Within the part A immediately over the screw is a nut mortise or chamber containing the movable frictional nut 10. Said nut is provided upon its under side with segmental threads 19 that correspond with the threads on the screw. In the upper part of this nut there is a longitudinal recess 11.

The nut 10 is of a length a little less than the mortise within which it lies, as shown in Fig. 4, and it is confined within said mortise by means of the cap 12 secured thereon in any proper manner, as for example, by the screws 13. In the middle portion of this cap on its under side there is an inward projection or boss 14 which extends into the spring chamber or recess and divides the same into two parts, and within one or both of said spring chambers I place a spring 15. A plan view of the nut mortise, the nut, the longitudinal recess of the nut and the boss 14, is shown by broken lines in Fig. 3. I also employ a screw 16 in the cap, which screw extends through the inward projection 14, its lower end bearing upon the bottom wall of the spring mortise or recess within the nut. By this construction the nut may be always firmly held down upon the screw, while the screw is prevented from dropping down at the rear end away from the nut by resting upon the bearing formed by the lower side of the screw hole 9.

As in other vises of this class, the screw may be confined against longitudinal movement within the part B and it may also be provided with means to limit its rotary movement. The movable member B may be moved quickly out or in when the screw is turned to such a position that the threads of the screw and nut are disengaged, as shown in Figs. 4 and 5. Upon turning the screw to tighten the jaws, if the threads coincide, they will come into direct engagement and then move the nut toward the vise jaws until it comes to the end of its mortise. The further turning of the screw will compress the vise jaws more firmly together. If when the screw is turned to engage the nut, the ends of the thread on the screw are not directly opposite the grooves of the nut but strike a little to the front of the summits of the rounded ends of the nut threads, the nut will move backwardly away from the vise jaws (provided the spring is not so strong as to overcome the friction incident to moving the member B) far enough to permit the threads on the screw to enter the grooves of the nut, after which the further turning of the screw will bring the nut up against that side of the mortise which is nearest the vise jaws and thereby enable pressure to be brought upon the jaws as before described. If on the other hand, the rounded ends of the threads on the screw present their summits a little to the rear of the summits of the ends of the nut threads, then the nut will move toward the vise jaws sufficiently to permit the threads on the screw to enter the grooves of the nut, after which pressure may be imparted by further turning the screw as before described. Thus it will be seen that after the jaws are brought together upon a piece of work there will be no backward movement of the jaw, or the member B, nor of the screw, the movement necessary to make the threads engage being accomplished by a movement of the nut instead of by a longitudinal movement of the screw.

By the employment of two springs, the nut is held centrally in its mortise and is capable of yielding in either direction accordingly to which ever way it may be pushed by the engaging ends of the thread. For some uses, only one of the springs may be employed; in which case the nut will be capable of yielding in one direction only instead of both. The movable nut is also capable of use without any spring or springs, inasmuch as turning the screw backwardly to open the vise jaws would have a tendency to throw the nut backwardly a little in its mortise so that it might be moved by engagement of the ends of the thread when the screw is turned to draw the jaws together.

I claim as my invention—

1. In a vise having two principal members, the segmental screw and the non rotary segmental nut having their blank spaces relatively arranged for sliding the screw longitudinally by the nut when the screw stands in a given position, said segmental nut being movably confined for sliding longitudinally within one of said members to facilitate the proper engagement of the threads, substantially as described and for the purpose specified.

2. In combination with the two principal members of the vise, the segmental screw, and the segmental nut having their blank spaces relatively arranged for sliding the screw longitudinally by the nut when the screw stands in a given position, said segmental nut being movably confined within a mortise and a spring for holding it in position and permitting it to yield in the longitudinal direction of the screw, substantially as described and for the purpose specified.

3. The combination of the two principal members of a vise, a segmental screw C, a bearing in the fixed one of said members for the lower side of said segmental screw, the segmental nut within a mortise above said screw, and the adjusting screw 16 for holding said nut down into engagement with said segmental screw, substantially as described and for the purpose specified.

4. In a vise, the segmental screw and movable segmental nut arranged to slide in the longitudinal direction of the screw and having the ends of their threads rounded off in both a backward and forward direction, substantially as described and for the purpose specified.

SAMUEL FRISBIE.

Witnesses:
W. E. GRAHAM,
W. A. HITCHCOCK.